(12) United States Patent
Morales

(10) Patent No.: US 6,995,669 B2
(45) Date of Patent: Feb. 7, 2006

(54) SYSTEM AND METHOD TO ENHANCE SECURITY OF SHIPPING CONTAINERS

(76) Inventor: Fernando Morales, 2231 Wakerobin La., Reston, VA (US) 20191

( * ) Notice: Subject to any disclaimer, the term of this patent is extended or adjusted under 35 U.S.C. 154(b) by 254 days.

(21) Appl. No.: 10/396,270

(22) Filed: Mar. 25, 2003

(65) Prior Publication Data

US 2004/0189466 A1   Sep. 30, 2004

(51) Int. Cl.
*G08B 1/08* (2006.01)
(52) U.S. Cl. .................. 340/539.31; 340/652; 340/635
(58) Field of Classification Search ................ 340/945, 340/984, 505, 539.31, 540, 541, 572.1, 635, 340/652, 673
See application file for complete search history.

(56) References Cited

U.S. PATENT DOCUMENTS

| | | | |
|---|---|---|---|
| 5,050,794 A * | 9/1991 | Wischusen, III ....... | 229/125.26 |
| 5,189,396 A * | 2/1993 | Stobbe ...................... | 340/541 |
| 5,406,263 A | 4/1995 | Tuttle | |
| 5,506,566 A * | 4/1996 | Oldfield et al. ............ | 340/550 |
| 5,515,030 A * | 5/1996 | Citron et al. ............ | 340/545.2 |
| 5,615,247 A | 3/1997 | Mills | |
| 5,646,592 A | 7/1997 | Tuttle | |
| 5,656,996 A | 8/1997 | Houser | |
| 5,705,981 A * | 1/1998 | Goldman ..................... | 340/541 |
| 5,774,876 A | 6/1998 | Woolley et al. | |
| 5,831,531 A | 11/1998 | Tuttle | |
| 5,892,441 A | 4/1999 | Wolley et al. | |
| 5,936,523 A * | 8/1999 | West ...................... | 340/545.6 |
| 6,002,501 A * | 12/1999 | Smith et al. .................. | 398/9 |
| 6,069,563 A | 5/2000 | Kadner et al. | |
| 6,097,306 A | 8/2000 | Leon et al. | |
| 6,281,793 B1 | 8/2001 | Haimovich et al. | |
| 6,317,025 B1 | 11/2001 | Leon et al. | |
| 6,553,336 B1 * | 4/2003 | Johnson et al. ............. | 702/188 |
| 6,664,887 B1 * | 12/2003 | Fuchs ...................... | 340/309.4 |
| 6,727,817 B2 * | 4/2004 | Maloney ................. | 340/572.8 |
| 2004/0066296 A1 * | 4/2004 | Atherton .................. | 340/572.1 |

FOREIGN PATENT DOCUMENTS

CA       2409624 A1 *   4/2004

OTHER PUBLICATIONS

M. Wolfe, Electronic Cargo Seals: Context, Technologies, and Marketplace (Federal Highway Administration White Paper No. 3, Jul., 2002).

* cited by examiner

*Primary Examiner*—Jeffery Hofsass
*Assistant Examiner*—Eric Blount
(74) *Attorney, Agent, or Firm*—Roberts, Abokhair & Mardula, LLC

(57) ABSTRACT

A system and method for enhancing the security of containers and the goods within them and for tracking a shipping container from its origin to its destination. A shipping container uses a breach containment system comprising a transmitter, a receiver, a processor, a status record and a plurality of conductors to detect any breach of the shipping container structure. The conductors are embedded in, or applied to, the structures that form the shipping container and are connected a processor. The processor maintains a local timer. Upon the sealing of the shipping container, the conductors form circuits and the local timer contributes a time value to the status record. An open circuit condition experienced by circuits formed by the conductors causes the local timer to be reset and status record to be revised to reflect the revised time value. A monitoring station maintains a master timer that is synchronized with the local timer when the shipping container is sealed. If the integrity of the shipping container is breached, the local timer value and the master timer value will be different indicating that a breach has occurred. The present invention also provides for reporting of the content of the status record to reporting stations for forwarding to a monitoring station.

20 Claims, 4 Drawing Sheets

SYSTEM AND METHOD TO ENHANCE SECURITY OF SHIPPING CONTAINERS

FIELD OF INVENTION

The present invention relates generally to containerized shipping of goods. More particularly, the present invention is a system and method for enhancing the security of containers and the goods within them and for tracking a shipping container from its origin to its destination.

BACKGROUND OF THE INVENTION

Containerized shipping was developed during World War II to expedite the delivery of war materials. Today, 17,000 shipping containers arriving daily in U.S. ports offering commercial enterprises an efficient, cost saving means of providing raw materials and inventory to customers around the world. The efficiencies achieved through containerized shipping have made "just-in-time" manufacturing possible for large segments of the world economy. It is estimated that ninety percent of all international trade is conducted using this shipping means.

Containerized shipping is susceptible to tampering. While only a few years ago tampering was largely an economic problem, in today's environment, containerized shipping may also be used as a vehicle for terror. With respect to terrorism, the shipping container may be used as a delivery means for a whole host of weapons. Terrorists may also see the shipping container as a target—as a means to disrupt the world economy in general and our domestic economy in particular.

Securing a shipping container is no easy task. A typical container 40 ft.×8 ft.×8 ft. with a maximum weight of 45,000 pounds. A smaller 20-ft. size can hold 35,000 pounds. Inspecting each container is a daunting, if not impossible, task. Large cargo ships can carry up to 6,000 containers. Korea and Japan are building container ships designed to carry 8,000 containers in an effort to handle a possible doubling in the volume of overall trade in the next decade. Less than two percent of all containers are ever inspected—with few U.S. Customs personal available for such duties. The U.S. alone has over 360 ports, many near major population centers.

Various approaches have been suggested for improving the security of shipping containers. U.S. Pat. No. 5,615,247 (Patent '247) issued to Mills discloses a cable security device for securing cargo doors on a transport container. The cables securing the door are joined together through a security device that detects when the cables are disconnected or cut. The device becomes secure once a security code is entered into the keypad device that controls the locking mechanism. The security device sends and receives a signal via a cellular telephone network to and from a remote data collection facility. The signal is transmitted through a high frequency signaling device attached to a cargo container through the use of a cable that is positioned through the closing mechanisms of the shipping container so as to monitor the opening of the door of the shipping container. Patent '247 fails to monitor access to the shipping container at locations other than the door.

U.S. Pat. No. 5,656,996 issued to Houser (Patent '996) discloses a sealing device that provides electronic monitoring of the status of the seal on containers that are bonded. The sealing means can communicate with a remote location such that status of the seal can be reported to a remote location. If the seal is broken, the date of the breakage is ascertainable. In one embodiment, the device is attached to the closing means of a container. The device comprises a circuit (electrical or light) that when broken causes a change in the status of the seal. Patent '996 does not teach a means for reporting intrusions to a container where the sealing device is not disturbed.

U.S. Pat. No. 6,281,793 to Haimovich (Patent '793) discloses an electronic monitoring apparatus in which an object is sealed with a cable with a known electrical signature. Circuitry senses a change in the electrical signature when the cable is removed from a securing means or if cut. The communication is by means of encrypted electronic communication.

U.S. Pat. No. 6,069,563 to Kadner (Patent '563) discloses a seal system integrated circuit with a special CMOS gate-array technology that can be utilized to build inexpensive tamper-resistant electronic seals. Change in seal status is recorded and stored in a database. Seals can be interrogated by a hand held seal reader/verifier.

U.S. Pat. No. 6,097,306 issued to Leon (Patent '306) discloses a lock for use in the transportation industry with a keypad for securing and monitoring the status of the lock via hand held activators. The lock attaches to a latching handle. Each lock has a log history containing the number of complete and incomplete opening transactions, when they occurred and the operator codes associated therewith. The '306 patent does not disclose integrating the circuitry throughout the sides of the shipping container. Patent '306 does not disclose interrogating the shipping container by a remote interrogation device.

U.S. Pat. No. 6,317,025B (Patent '025B) issued to Leon is a continuation of U.S. Pat. No. 6,097,306 and discloses an external lock for transportation industry with a keyboard and hand held activator programmable by a central system and activators via transmitters and receivers. The locks are opened by IR transmission of the appropriate codes or by keypad entries. The locking device maintains a transaction history containing the number of complete and incomplete opening transactions, when they occurred and the operator codes associated therewith.

U.S. Pat. No. 5,892,441 issued to Woolley (Patent '441) discloses an electronic tag sensor system and method for monitoring objects in storage or in transit. Each tag contains circuitry for communicating information relating an object to be tracked and in relation to other objects to be tracked having like sensor tags attached. In an embodiment, the system is used in conjunction with a shipping container to detect unauthorized opening of the shipping container. Patent '441 does not contemplate integrating the tag or its circuitry within the shipping container.

U.S. Pat. No. 5,774,876 issued to Woolley, discloses a system and method for managing assets with active control tags where one or more electronic tags are used to track items in transit. The electronic tags communicate through RF and IR. The electronic tags contain memory for storing information regarding position of the tag and the status of the tag (attach/detach) in relation to the asset to be tracked in transit. Patent '876 does not contemplate integrating the tag or its circuitry within the shipping container to be tracked.

U.S. Pat. No. 5,189,396 issued to Stobbe (Patent '396) discloses an electronic seal for a casing which records logistics data, time of change in the seal state, time zone, as well as other information in a memory. The sealing strip and locking device control the counter. The data is not displayed without disengagement of the seal wire from the seal body. There is no interrogation or transmission of a signal to a receiving unit.

U.S. Pat. Nos. 5,406,263, 5,646,592, and 5,831,531 issued to Tuttle disclose a transceiver tag having a continuity circuit which records connection fidelity between two nodes that span an open/closed portion of a container. The transceiver tag is monitored by a computer controlled transceiver unit that is capable of interrogating the container status. In addition, the patents also discloses continuity of the security system transceiver tag to include an entry/exit door in the framework. While the transceiver unit may be incorporated into the structure of the container, the continuity circuit comprises only two nodes.

Collectively, the cited references disclose means for providing a level of security for shipping containers and for interrogating the security means for certain data relating to the shipping container. What is missing from the references are means to:

- detect any breach of the shipping container and means to provide transit status information to the shipper and the receiver without directed interrogation of the security system;
- stop the container at any inspection point (or conduct other action such as but not limited to surveillance) if a breach has occurred and/or if the container contains specific cargo identified by authorities;
- load a list of all the items shipped in a container on a monitoring station using any personal computer connected to a worldwide network;
- connect a personal computer to a worldwide network and synchronize a security device timer installed in the cargo container with a corresponding virtual timer at the monitoring station;
- protect the integrity of the overall container system by using a different encryption key for each container security device; and
- activate the security system by closing the container doors without entering passwords or pushing buttons.

What would be useful is a tamper-resistant system and method for securing a shipping container wherein the system and method would detect any breach of the shipping container, report transit status information of the shipping container without directed interrogation, and allow a monitoring station to take remedial action in the event that the container contains an item of interest to authorized law enforcement agencies.

BRIEF SUMMARY OF THE INVENTION

An embodiment of the present invention is a tamper-resistant system and method for detecting a breach of a shipping container, reporting transit status information of the shipping container without directed interrogation, and allowing a monitoring station to take remedial in the event that the integrity of the container is breached or contains an item of interest to authorized law enforcement agencies.

It is therefore an aspect of the present invention to detect a breach of a shipping container.

It another aspect of the present invention to integrate breach detection conductors into the structures that form a shipping container.

It is yet another aspect of the present invention to report any breach of a shipping container without directed interrogation.

It is still another aspect of the present invention to collect and report transit status information of the shipping container without directed interrogation.

It is another aspect of the present invention to incorporate information receiving stations into devices used to move shipping containers.

These and other aspects of the present invention will become apparent from a review of the general and detailed descriptions that follow. In an embodiment of the present invention, breach containment system is used to secure a shipping container. The breach detection system comprises a processor, a status record and one or more conductors. The conductors are embedded in the structures that form the shipping container or applied to internal or external surfaces of the structures that form the shipping container. In a shipping container with a rectangular volume, these structures comprise vertical walls, a top, a bottom, a fixed end, and a sealable opening. The conductors circumscribe the shipping container in both the horizontal and vertical planes (including the sealable openings). When the shipping container is sealed, the conductors form closed circuits. A processor is adapted to maintain a local timer (initialized at the time the shipping container is sealed). Additionally, a master timer is maintained at a monitoring station. The master timer and the local timer are synchronized. If a circuit is broken after the container is sealed, the local timer is reset, and the status record is revised to reflect the new time value. When the shipping container arrives at its destination, the time value as reflected in the status record is compare to the time value of the master timer. If the local time value differs from the master time value by more than a pre-determined amount, the integrity of the shipping container has been breached. If the integrity of the shipping container has been breached, remedial action is taken. In an embodiment, remedial action comprises alerting law enforcement agencies, monitoring the shipping container, and stopping the shipping container in transit.

In an embodiment of the present invention, the conductors are embedded in a plastic tape or film that is attached to the inside surfaces of the structures that form the container, the outside surfaces of the structures that form the container, or to both. In another embodiment of the present invention, the conductors are embedded in floor carpet and wall treatments that are applied to the inside surfaces of the structures that form the containers. In yet another embodiment of the present invention, the conductors are integrated into a container-size flexible bag that is made to conform to the outside surfaces of the structures that form the container by the use of vacuum and/or made to conform to the inside surfaces of the structures of the container by use of air pressure. The container-size flexible bag is attached to the surfaces of the structures that form the container by means known to those skilled in the art of the present invention.

In another embodiment, the breach detection system further comprises a transmitter and a receiver. The receiver detects the presence of a reporting station within range of the transmitter. The transmitter is adapted to send the content of the status record to the reporting station (in an encrypted form) detected to be within range of the transmitter.

In yet another embodiment, the processor comprises a tamper-resistant integrated circuit. In still another embodiment, the content of the status record is encrypted with a key secretly that is specific to each container and that is kept at the monitoring station. In another embodiment of the present invention, the status record is maintained within the processor.

DETAILED DESCRIPTION OF THE INVENTION

Figure 1:
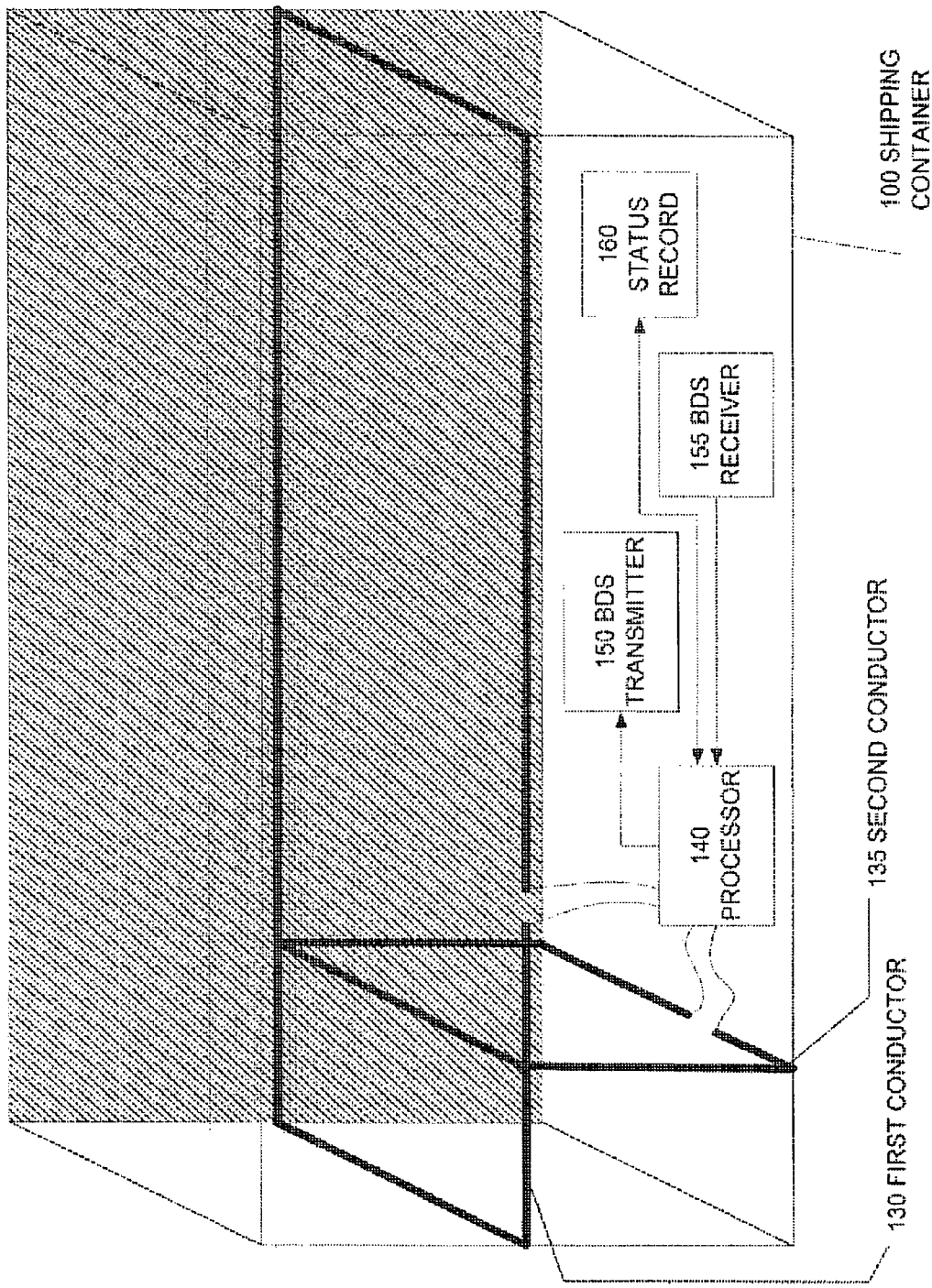
FIG. 1 illustrates a shipping container using a breach detection system according to an embodiment of the present invention.

In an embodiment of the present invention, a breach detection system comprising two conductors, a processor with an ID, and a transmitter and a receiver working as an ID tag is used to secure a shipping container. Referring to FIG. 1, this embodiment of the present invention is illustrated. Shipping container 100 comprises a rectangular volume. Shipping container 100 uses a breach detection system (BDS) comprising a processor 140, a BDS transmitter 150, a BDS receiver 155, a status record 160, a first conductor 130 and a second conductor 135. First conductor 130 circumscribes the shipping container in a horizontal plane and second conductor 135 circumscribes the shipping container 100 in a vertical plane. The first and second conductors 130 and 135 are embedded into the structures that form shipping container 100 and terminate at processor 140. Once shipping container 100 is sealed, two circuits are formed by first conductor 130 and second conductor 135 and energized. After the shipping container 100 is sealed, processor 140 is adapted to detect an open circuit condition in either of the two circuits formed by first conductor 130 and second conductor 135.

While FIG. 1 illustrates a shipping container that defines a rectangular space, the present invention is not so limited. As will be apparent to those skilled in the art, any shape shipping container of a size large enough to house the breach detection system may be used without departing from the scope of the present invention.

While FIG. 1 illustrates the use of two conductors, this is not meant as a limitation. As will be apparent to those skilled in the art, any number of conductors may be embedded in the walls forming the shipping container without departing from the scope of the present invention. In an alternate embodiment, the two conductors are connected to form a single circuit. In yet another embodiment, only a single continuous conductor is used to circumscribe the shipping container in both the horizontal and vertical planes.

Figure 2:
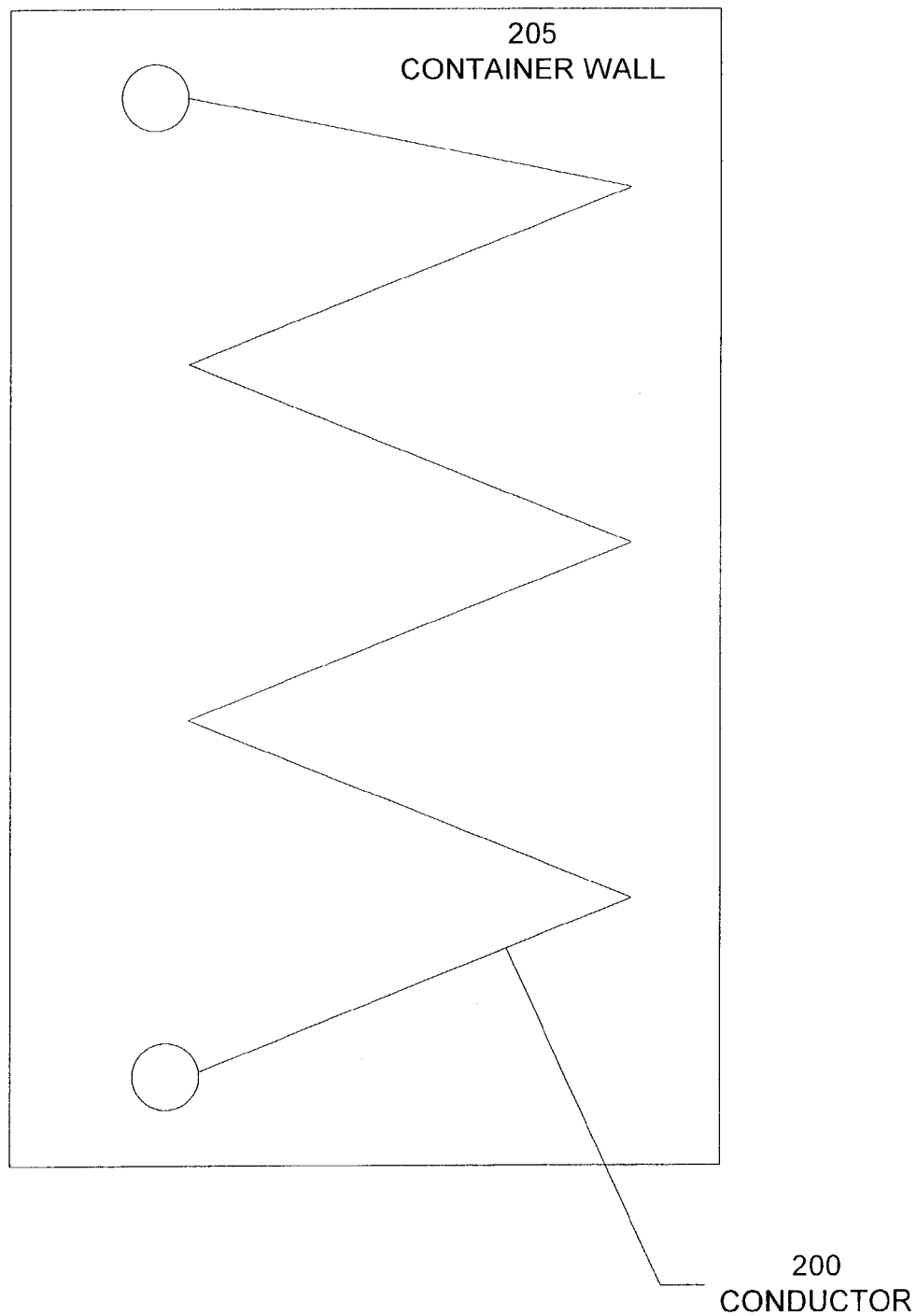
FIG. 2 illustrates a conductor woven into a wall of a shipping container according to an embodiment of the present invention.

Referring to FIG. 2, an alternate embodiment of the present invention is illustrated. In this embodiment a conductor 200 is woven across a shipping container wall 205. As illustrated, the pattern of the weave is uniform but this is not meant as a limitation. In an embodiment of the presenting invention, a shipping container (not illustrated) is constructed using the shipping container walls as illustrated in FIG. 2. In an alternate embodiment, this shipping container also comprises conductors that circumscribed the walls of the shipping container as described in reference to FIG. 1.

A conductor may be an electrical conductor or a light conductor. In an embodiment of the present invention, both electrical conductors and lights conductors are used.

In an embodiment of the present invention, processor 140 comprises a tamper-resistant integrated circuit as known in the art. In still another embodiment, the status record 160 is held within the processor 140. In an alternate embodiment, processor 140 comprises a plurality of tamper-resistant integrated circuits. In yet another embodiment, the contents of status record 160 is encrypted using a key stored on the monitoring station for each device.

Figure 3:
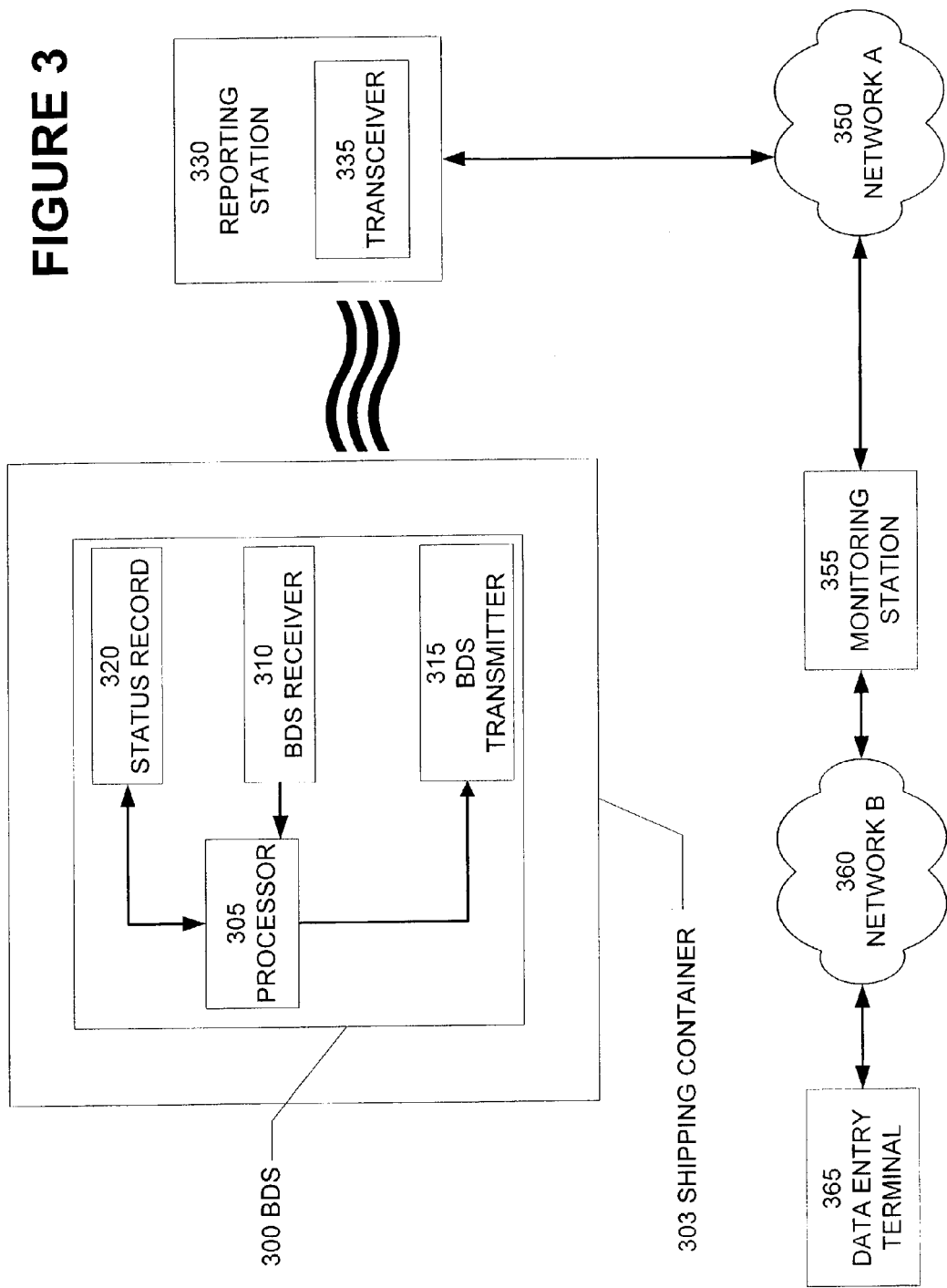
FIG. 3 illustrates a system according to an embodiment of the present invention in which a shipping container equipped with a breach detection system operates in conjunction with a reporting station, monitoring station and the origination data entry unit.

FIG. 3 illustrates a system according to an embodiment of the present invention in which a shipping container equipped with a breach detection system operates in conjunction with a reporting system. Shipping container 303 uses breach detection system (BDS) 300 comprising a processor 305, a BDS receiver 310, a BDS transmitter 315, a status record 320, and a plurality of conductors (not illustrated). As will be apparent to those skilled in the art, any number of conductors may be embedded in the walls forming the shipping container without departing from the scope of the present invention. In an alternate embodiment, multiple conductors are connected to form a single circuit. In yet another embodiment, only a single continuous conductor is used to circumscribe the shipping container in both the horizontal and vertical planes.

In an embodiment of the present invention, circuits are formed in the conductors when the shipping container 303 is sealed. Processor 305 is adapted to detect an open circuit condition in any of these circuits and to maintain a local timer that is initialized with the sealing of shipping container 303. The status record 320 comprises information about shipping container 303. In an embodiment, the information held in the status record 320 comprises a time value, a location identifier, and a shipping container identifier. The time value represents the value of the local timer maintained by processor 305.

A reporting station 330 comprises a transceiver 335 that communicates with BDS 300 via the BDS receiver 310 and the BDS transmitter 315. The BDS receiver 310 detects the presence of reporting station 330 and BDS transmitter 315 transmits data to the reporting station 330. These data are preferably in an encrypted form as is the content of status record 320 as of the time the data is reported to the reporting station 330. In another embodiment, the reporting station data comprises a station identifier.

In yet another embodiment of the present invention, BDS transmitter 315 communicates with transceiver 335 via a wireless network. By way of illustration, and not as a limitation, BDS transmitter 315 complies with IEEE standard 802.11x.

In still another embodiment of the present invention, multiple reporting stations 330 are located where the shipping container is sealed and at each shipping point along the path taken by the shipping container to its destination. By way of illustration and not as a limitation, a reporting station 330 may be deployed at a point of origin, at a loading dock, on lifting equipment, on a vessel, and at the point of destination.

In an embodiment of the present invention, processor 305 comprises a tamper-resistant integrated circuit as known in the art. In an alternate embodiment, processor 305 comprises a plurality of tamper-resistant integrated circuits. In still another embodiment of the present invention, and status record 320 is maintained within processor 305. The content of the status record 320 is encrypted using a key stored at a monitoring station 355. In another embodiment of the present invention, a status record 320 is maintained for each processor 305 deployed in a container 300 and each such status record 320 is encrypted using a unique key.

The reporting station 330 communicates with the monitoring station 355 over network A 350. In an embodiment of the present invention, network A 350 is the Internet. In an alternate embodiment of the present invention, network A 350 is a secure network using means known in the art. However, as will be appreciated by those skilled in the art, any network may be used to communicate between the reporting station 330 and the monitoring station 355 without departing from the scope of the present invention. By way of example, network A 350 may be a wired or wireless network.

Monitoring station 355 is accessible to a data entry terminal 365 via network B 360. In an embodiment of the present invention, network B 360 is the Internet. However, as will be appreciated by those skilled in the art, any network may be used to communicate between the monitoring station 355 and the data entry terminal 365 without departing from the scope of the present invention. By way of example, network B 360 may be a wired or wireless network.

Data entry terminal 365 communicates with monitoring station 355 over Network B 360 and permits data relating to shipping container 303 to be stored on the monitoring station 355. In an embodiment of the present invention, data entry terminal 365 is used to synchronize the value of a master timer running on the monitoring station 355 and the value of the local timer maintained by processor 305. In an embodiment of the present invention, a difference between these timers after synchronization is evidence that a breach of shipping container 300 has occurred.

Figure 4:
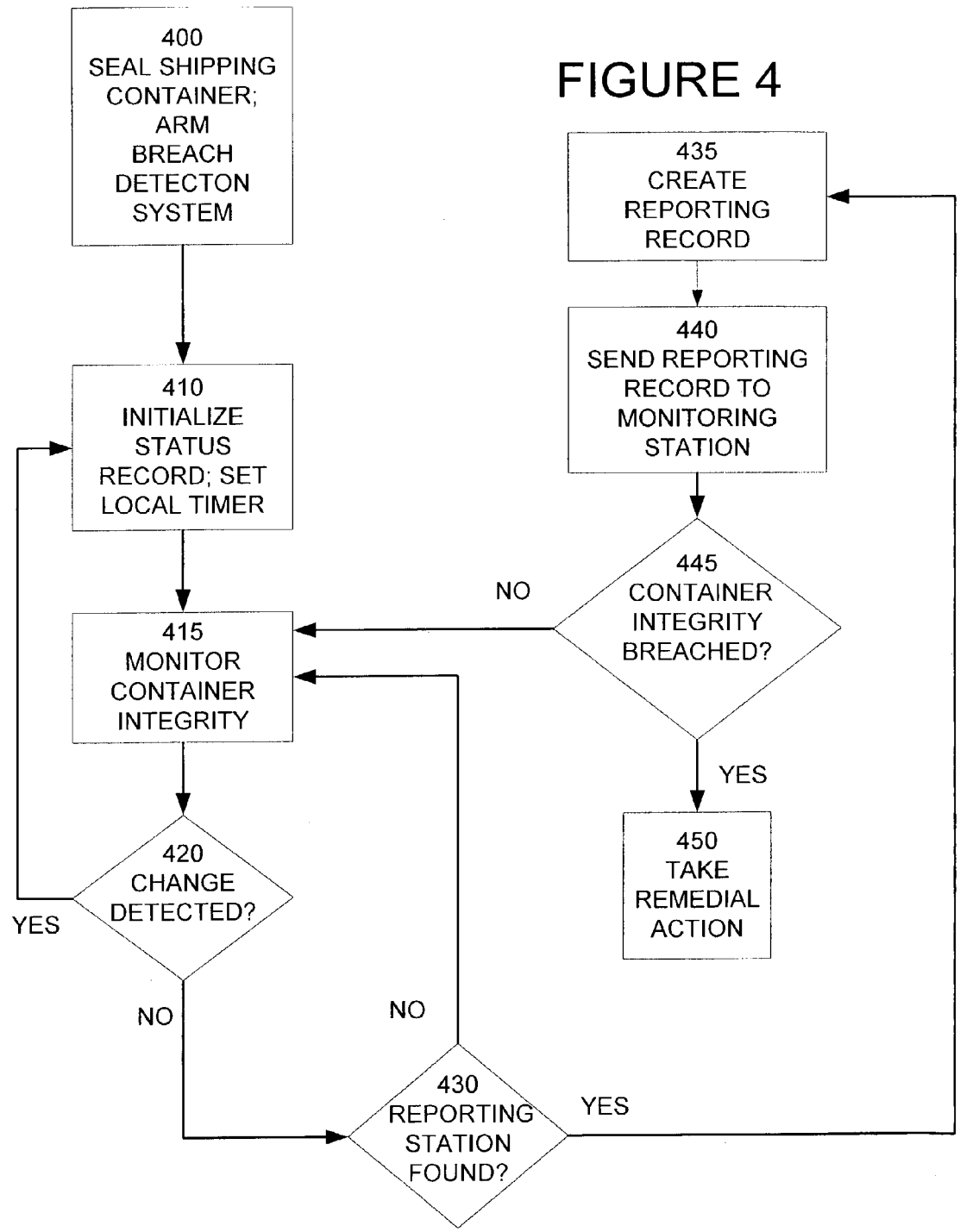
FIG. 4 illustrates a flow according to an embodiment of the present invention in which a breach detection system and monitoring station determines that a breach of a shipping container has occurred and reports the breach to a reporting station.

FIG. 4 illustrates a flow according to an embodiment of the present invention. A shipping container is sealed 400 and a breach detection system is armed. The sealing of the shipping container causes at least one circuit to be formed by each conductor deployed in and around the structures that form the container. By way of illustration and not as a limitation, in a shipping container having a rectangular volume, at least one circuit is form around the walls, the top, the floor, the end and the doors of the shipping container. In this embodiment of the present invention, no act separate from sealing the shipping container is required to arm the breach detection system. The breach detection system is adapted to detect an open circuit condition in the circuits formed when the shipping container is sealed.

A container status record is initialized 410 with the transit status information stored on the monitoring station for that particular device. In an embodiment, the transit status information comprises a time value, a location identifier, and a shipping container identifier. Upon initialization, a master timer running on the monitoring station and associated with the container is synchronized with a local timer maintained by the processor component of the breach detection system. The integrity of the shipping container is monitored 415 and a determination is made 420 if the integrity of the shipping container has been breached. In an embodiment of the present invention, the integrity of the shipping container is breached if any circuit formed when the shipping container was sealed experiences an open circuit condition. By way of illustration, an open circuit condition would occur if the shipping container is pierced or if the shipping container doors are opened. If a change in the integrity of the shipping container is detected, the local timer maintained by the processor component of the breach detection system is reset 410 to the time value of the local timer at the time the shipping container was sealed 400. The status record is revised to reflect the new time value of the local timer.

If the integrity of the shipping container has not changed, a determination is made if a BDS receiver has detected a reporting station 430. If a reporting station is not detected, the process returns monitoring the shipping container status 415. If a reporting station is detected, a reporting record is created 435. In an embodiment, the reporting record comprises a status record data and a reporting station identifier. However, the invention is not so limited. As will be apparent to those skilled in the art, any data useful to reconstructing the path of a shipping container may be captured without departing from the scope of the present invention. The reporting record is sent to the monitoring station 440. The monitoring station determines if a breach of the shipping container has occurred 445 by comparing the time value of a master timer maintained on the monitoring station and associated with the BDS of the shipping container to time the value of the local timer maintained by the processor component of the BDS. If the two time values differ by a pre-determined amount, a breach will be deemed to have occurred and remedial action will be taken 450. In an embodiment, remedial action comprises alerting law enforcement agencies, monitoring the shipping container, and stopping the shipping container in transit. If no difference in the timer values is found, or if the difference does not exceed the pre-determined value, the process returns to monitoring the integrity of the shipping container 415.

When the shipping container arrives at its destination, if a reporting record has been relayed to a monitoring station, the integrity of the shipping container will be known. If however, reporting stations were not encountered or if the reporting record failed to arrive at the monitoring station, the status record of the shipping container may be checked at the destination to determine if a breach of the shipping container occurred. If a breach is determined to have occurred, remedial action is taken.

In an embodiment of the present invention, the status record may be checked only by using a security code to access the breach detection system. In this embodiment, the status record is sent to a monitoring station (440) via a reporting station. The reporting station cannot read or alter the content of the status record. Only the monitoring station is privy to a decryption key or device that allows the content of the file to be displayed. In an alternate embodiment, the monitoring station can also determine if the status record has been tampered with.

A system and method to enhance security of shipping containers has been described. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A shipping container breach detection system comprising:
   a shipping container;
   a breach detection system (BDS) integrated into the shipping container and including a record;
   at least one reporting station for receiving record data from the BDS; and
   a monitoring station in network communication with the at least one reporting station, the BDS comprising a local timer adapted to contribute a time value to the record when the shipping container is sealed and further adapted to contribute a revised time value to the record when the integrity of the container is breached and the monitoring station comprising a corresponding master timer synchronized with the local timer of the BDS.

2. The shipping container breach detection system of claim 1 further comprising:
a plurality of conductors, wherein each conductor is embedded in structures that comprise the shipping container adapted to form one or more circuits; and
a processor, the processor adapted to determine if any one of the one or more circuits is opened after the container is sealed.

3. The system of claim 1, wherein a conductor comprises an electrical conductor.

4. The system of claim 1, wherein a conductor comprises a light conductor.

5. The system of claim 2, wherein the processor comprises a tamper-resistant integrated circuit.

6. The system of claim 2, wherein the processor is adapted to encrypt the record.

7. The system of claim 2 wherein:
the BDS further comprises a transmitter adapted to transmit the record to the at least one reporting station; and
said monitoring station is adapted to receive the record over a network from the at least one reporting station and make a determination that the integrity of the container has been breached.

8. The system of claim 7 wherein the monitoring station is further adapted to take remedial action when the determination that the integrity of the container has been breached has been made.

9. A method for detecting a breach in the integrity of a shipping container comprising:
integrating a breach detection system (BDS) into a shipping container;
sealing the container;
setting a local timer in the BDS upon the sealing of the container to contribute a time value to a record;
synchronizing a corresponding master timer at a monitoring station with the local timer;
revising the time value in the record when the integrity of the container is breached;
transmitting the record to a reporting station; and
communicating the record from the reporting station to the monitoring station over a network.

10. The method for detecting a breach in the integrity of a shipping container of claim 9 further comprising:
providing the BDS with a plurality of conductors, wherein each conductor is embedded in structures that comprise the shipping container so as to form one or more circuits; and
providing the BDS with a processor adapted to determine if any one of the one or more circuits is opened after the container is sealed.

11. The method for detecting a breach in the integrity of a shipping container of claim 9 wherein the conductor comprises an electrical conductor.

12. The method for detecting a breach in the integrity of a shipping container of claim 9 wherein the conductor comprises a light conductor.

13. The method for detecting a breach in the integrity of a shipping container of claim 10 wherein the processor comprises a tamper-resistant integrated circuit.

14. The method for detecting a breach in the integrity of a shipping container of claim 10 wherein the processor is adapted to encrypt the record.

15. The method for detecting a breach in the integrity of a shipping container of claim 10 further comprising:
providing a transmitter to the BDS to transmit the record to the reporting station; and
receiving the record at the monitoring station over a network from the reporting station and making a determination that the integrity of the container has been breached.

16. The method for detecting a breach in the integrity of a shipping container of claim 10 wherein the monitoring station is further adapted to take remedial action when the determination that the integrity of the container has been breached has been made.

17. The system of claim 6, wherein the at least one reporting station lacks a decryption key and the monitoring station includes a decryption key.

18. The system of claim 2, wherein the monitoring station comprises a list of all items in the shipping container.

19. The method of claim 14, further comprising decrypting of the record at the monitoring station.

20. The method of claim 10, further comprising storing a list of all items in the shipping container at the monitoring station.

* * * * *